United States Patent [19]

Shu

[11] Patent Number: 4,964,463

[45] Date of Patent: Oct. 23, 1990

[54] CROSSLINKED POLYVINYL AMINE COPOLYMER GELS FOR USE UNDER HARSH RESERVOIR CONDITIONS

[75] Inventor: Paul Shu, Cranbury, N.J.

[73] Assignee: Mobil Oil Corporation, Fairfax, Va.

[21] Appl. No.: 422,199

[22] Filed: Oct. 16, 1989

[51] Int. Cl.$^5$ .................... E21B 33/138; E21B 43/22; E21B 43/24

[52] U.S. Cl. .................... 166/270; 166/272; 166/274; 166/295; 523/130

[58] Field of Search .................... 166/270, 272–274, 166/295, 300, 303; 523/130; 252/8.551, 8.554

[56] References Cited

U.S. PATENT DOCUMENTS

| | | | |
|---|---|---|---|
| 3,305,016 | 2/1967 | Lindblom et al. | |
| 3,344,063 | 9/1967 | Stratton | |
| 3,810,882 | 5/1974 | Browning et al. | |
| 3,908,760 | 9/1975 | Clampitt et al. | 166/246 |
| 4,009,755 | 3/1977 | Sandifold | 166/270 |
| 4,069,869 | 1/1978 | Sandifold | 166/270 |
| 4,440,228 | 4/1984 | Swanson | 166/274 |
| 4,776,398 | 10/1988 | Chu et al. | 166/295 X |
| 4,782,900 | 11/1988 | Fung et al. | 166/295 X |
| 4,795,770 | 1/1989 | Lai et al. | 252/8.551 |
| 4,798,871 | 1/1989 | Lai et al. | 525/328.2 |
| 4,804,793 | 1/1989 | Lai et al. | 574/445 |
| 4,814,096 | 3/1989 | Evani | 252/8.554 |
| 4,859,717 | 8/1989 | Hoskin et al. | 166/295 X |
| 4,861,499 | 8/1989 | Neff et al. | 252/8.551 |

*Primary Examiner*—George A. Suchfield
*Attorney, Agent, or Firm*—A. J. McKillop; C. J. Speciale; M. J. Mlotkowski

[57] ABSTRACT

A gel-forming composition capable of plugging highly permeable zones in a subterranean formation. The composition comprises water, a viscosifying amount of a water-dispersible polyvinyl amine copolymer and a crosslinking agent which is a mixture of an aldehyde and a phenolic component in an amount effective to cause gelation of the aqueous solution of the copolymer. The resultant gel is exceptionally thermally stable and, therefore, can be used as an effective profile control agent in all enhanced oil recovery operations, including steam flooding.

10 Claims, No Drawings

CROSSLINKED POLYVINYL AMINE COPOLYMER GELS FOR USE UNDER HARSH RESERVOIR CONDITIONS

FIELD OF THE INVENTION

This invention relates to organically crosslinked polyvinyl amine copolymer gels and to the use thereof in controlling the permeability of subterranean oil-bearing formations.

BACKGROUND OF THE INVENTION

Generally, in the production of oil from subterranean formations, only a small fraction of the total oil present within the formation can be recovered through the use of primary recovery methods which utilize only the natural forces present in the reservoir. To recover additional oil, a variety of supplemental production techniques have been developed. In these supplemental techniques, commonly referred to as secondary or tertiary recovery operations, a fluid is introduced into the oil-bearing formation in order to displace oil to a production system comprising one or more production wells. The displacing or "drive" fluid may be an aqueous liquid such as brine of fresh water, a gas such as carbon dioxide, steam or dense-phase carbon dioxide, an oil-miscible liquid such as butane, or an oil and water-miscible liquid such as an alcohol. Often, the most cost-effective and desirable secondary recovery methods involve the injection of steam. In practice, a number of injection and production wells will be used in a given field arranged in conventional patterns such as a line drive, a five spot or inverted five spot, or a seven spot or inverted seven spot.

In the use of the various flooding techniques, it has become a common expedient to add various polymeric thickening agents to the drive fluid to increase its viscosity to a point where it approaches that of the oil to be displaced, thus improving the displacement of oil from the formation. The polymers used for this purpose are often said to be used for "mobility" control.

Another problem encountered is that cerain injected drive fluids may be much lighter than the reservoir fluids and thus separate by gravity, rising toward the top of the flowing region and resulting in the bypassing of the lower regions. This phenomena is known as gravity override.

Also encountered in the use of the various flooding techniques is a situation caused by the fact that different regions or strata often have different permeabilities. When this situation is encountered, the drive fluid may preferentially enter regions of higher permeability due to their lower resistance to flow rather than the regions of low permeability where significant volumes of oil often reside.

It therefore is often desirable to plug the regions of high permeability, or "thief" zones, either partly or entirely, so as to divert the drive fluid into regions of lower permeability. The mechanical isolation of these thief zones has been tried but vertical communicating among reservoir strata often renders this method ineffective. Physical plugging of the high permeability regions by cements and solid slurries has also been tried with varying degrees of success; however, these techniques have the drawback that still-productive sites may be permanently closed.

As a result of these earlier efforts, the desirability of designing a slug capable of sealing off the most permeable layers so that the drive fluid would be diverted to the underswept, "tighter" regions of the reservoir, became evident. This led to the use of oil/water emulsions, as well as gels and polymers for controlling the permeability of the formations. This process is frequently referred to as "flood conformance" or "profile control", a reference to the control of the vertical permeability profile of the reservoir. Profile control agents which have been proposed include oil/water emulsions, gels, e.g., lignosulfate gels and polymeric gels, with polymeric gels being the most extensively applied in recent years.

Among the polymers so far examined for improving flood conformance are polyacrylamides, polysaccharides, celluloses, furfural-alcohol and acrylic/epoxy resins, silicates and polyisocyanurates. A major part of this work has been conducted with the polyacrylamides, both in their normal, non-crosslinked form, as well as in the form of metal complexes, as described, for example, in U.S. Pat. No. 4,009,755, 4,069,869 and 4,413,680. In either form, the benefical effects derived from these polyacrylamides seem to dissipate rapidly due to shear degradation during injection and sensitivity to reservoir brines, high pH and high temperature. To overcome these problems and to achieve deeper polymer penetration into the reservoir, dilute solutions of these polymers have sometimes been injected first and then complexed in situ.

Another group of polymeric thickeners which has received considerable attention for use in improving flooding are polysaccharides, particularly those produced by the action of bacteria of the genus Xanthomonas on carbohydrates. For example, U.S. Pat. Nos. 3,757,863 and 3,383,307 disclose a process for mobility control by the use of polysaccharides.

U.S. Pat. Nos. 3,741,307, 4,009,755 and 4,069,869 disclose the use of polysaccharides in the control of reservoir permeability. U.S. Pat. No. 4,413,680 describes the use of crosslinked polysaccharides for selective permeability control in oil reservoirs.

U.S. Pat. No. 3,908,760 describes a polymer waterflooding process in which a gelled, water-soluble Xanthomonas polysaccharide is injected into a stratified reservoir to form a slug, band or front of gel extending vertically across both high permeability and low permeability strata. This patent also suggests the use of complexed polysaccharides to block natural or man-made fractures in formations. The use of polyvalent metal ions for cross-linking polysaccharides is also disclosed in U.S. Pat. No. 3,810,822.

Another type of polysaccharide which has been experimented with in the area of profile control is the non-xanthan, heteropolysaccharide S-130. S-130 is a member of a group of welan gums and is produced by fermentation with a microorganism of the genus Alcaligenes. Another welan gum heteropolysaccharide, known as S-194, is also produced by fermentation with a microorganism of the genus Alcaligenes. A notable characteristic of the heteropolysaccharide S-130 is that it develops a high viscosity in saline waters. This is particularly so in brines which contain divalent cations such as $Ca^{2+}$ and $M^{2+}$ or monovalent cations such as $Na^+$ and $K^+$. U.S. Pat. No. 4,658,898 discloses the use of welan gum S-130 in saline waters. Crosslinking with trivalent cations, such as chromium, aluminum, zirconium and iron is also disclosed.

The use of various block copolymers for mobility control in waterflooding operations is described in U.S. Pat. Nos. 4,110,232, 4,120,801 and 4,222,881. Chung et al., U.S. Pat. No. 4,653,585, disclose the use of block copolymers, which may be crosslinked with polyvalent metal ions, for use as permeability control agents in enhanced oil recovery applications.

While a number of the different compositions discussed have been proposed for permeability control, some of these compositions may be unsuitable for use as permeability control agents under certain circumstances. For example, the polymers of Chung et al, may not be effectively crosslinked with polyvalent metal ions under all conditions encountered in the enhanced oil recovery applications, e.g., in acidic conditions commonly found in carbon dioxide ($CO_2$) flooding operations. Polyacrylamides display instability in the presence of high brine concentration at temperatures oven 70° C. Xanthan gums are very brine tolerant but display thermal instability, even at temperatures below 60° C. Still, other polymers are unsuitable as permeability control agents when used in conjunction with steam flooding operations. This is due to the fact that they lose their structural integrity (i.e., they undergo "syneresis") at the high temperatures generated during such operations.

Syneresis is the contraction or shrinking of a gel so that liquid is exuded at the gel surface. For example, a gel said to exhibit 20% syneresis would take up 80% of its original volume, with the remaining 20% being expelled water. Although the exact mechanism responsible for the syneresis of such gel-forming compositions is not fully understood, it is believed to result from the over-crosslinking of the polymeric material with time. While it is not yet known what an acceptable level of syneresis might be for profile control gels, it is believed that to minimize syneresis would enhance the effectiveness of such gels.

In view, therefore, of the severe conditions which include both high brine concentrations, elevated temperatures, or both, there is a need for brine tolerant, thermally-stable materials suitable for high temperature wells and steam flooded walls. This has led to the development of the so-called hostile environment polymers, such as those marketed by the Phillips Petroleum Company of Bartlesville, Okla. and the Hoechst Celanese Corporation of Somerville, N.J.

Despite these developments, a need still exsist for permeability control agents which are compatible with the harsh conditions encountered in steam flooding or other enhanced oil recovery operations in which high temperatures and/or conditions of high salinity are encountered.

It is, therefore, an object of the present invention to provide a polymer gel-forming composition for injection in a subterranean reservoir which has good thermal stability at high brine concentration.

It is another object of the present invention to provide a polymer gel which can be used effectively as a permeability control agent under the extreme temperature conditions encountered in the steam flooding of underground formations.

It is a further object of the present invention to provide an aqueous crosslinked polyvinyl amine copolymer gel for use in profile control applications.

Other objects and the several advantages of the resent invention will become apparent to those skilled in the art upon a reading of the specification and the claims appended thereto.

SUMMARY OF THE INVENTION

According to the present invention, there is provided an aqueous-based polymeric composition capable of forming a stable gel under harsh subterranean formation conditions which is comprised of water, a water-dispersible copolymer of polyvinyl amine and a crosslinking agent which is either a preformed phenolic resin or a mixture of a phenolic component and an aldehyde. The gel-forming compostion is an effective permeability control agent and finds particular utility in steam flooding operations where it is stable even when conditions of high salinity and high underground formation temperatures are encountered.

DESCRIPTION OF THE PREFERRED EMBODIMENTS

Any water-dispersible or water-soluble polyvinyl amine copolymer capable of forming stable aqueous gels in the presence of a phenolic resin or phenol/aldehyde mixture is contemplated for use in the practice of the present invention. Preferred are copolymers of vinylamine and vinylamide. Particularly preferred are the copolymers of vinylamine and vinylamide having the following structure:

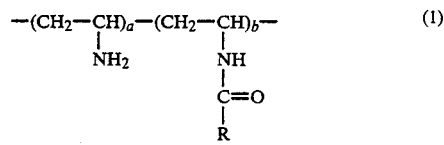

wherein:
R may be an alkyl or aryl group having no more than 16 carbo carbon atoms; and,
a and b are mole fractions of each co-monomer unit such that $a+b=1$, and $a \neq 0$ and $b \neq 0$.

In the usual case, copolymers having a molecular weight of at least about 10,000, with about 2 mole percent vinylamine units, can be used to form advantageous gels. More desirable are copolymers having a molecular weight of about 100,000, with about 10 to about 30 mole percent of vinylamine units. The vinylamide comonomer unit can be an N-vinylalkyl or an N-arylamide such as N-vinylacarbamate, N-vinylacetamide or N-vinylphthalimide. Processes for the production of these copolymeric materials are described in U.S. Pat. Nos. 4,795,770, 4,798,871 and 4,804,793, the contents of each incorporated by reference in their entirety for all that they disclose.

The crosslinking agents useful in the practice of this invention are selected from the group consisting of preformed phenolic resins and mixtures of a phenolic component and an aldehyde. Phenolic components suitable for use in the present invention are phenol or derivatives thereof, such as catechol, resorcinol, phloroglucinol, pyrogallol, 4,4'-diphenol, and 1,3-dihydroxynaphthalen. Other phenolic components that can be used include at least one member of selected oxidized phenolic materials of natural or synthetic origin, such as 1,4-benzoquinone, hydroquinone or quinhydrone, as well as a natural of modified tannin, such as quebracho or sulfomethylated quebracho possessing a degree of sulfomethylation (DSM) up to about 50. (See U.S. Pat. No. 3,344,063, Col. 3, lines 15–32, which is hereby incorporated herein by reference). The DSM of sulfomethylated quebracho (SMQ) is sometimes indicated as, for example, SMQ 50 for SMQ having a DSM of 50. Phenol is the preferred phenolic compound for use in the present invention.

Any suitable water-dispersible aldehyde can be used in the practice of the invention. Thus, under proper conditions of use, both aliphatic and aromatic moinoaldehydes, and also dialdehydes, can be used. The aliphatic monoaldehydes containing from one to about 10 carbon atoms per molecule are preferred. Representative examples of such aldehydes include formaldehyde, paraformaldehyde, acetaldehyde, propionaldehyde, butyraldehyde, isobutyraldehyde, valeraldehyde, heptaldehyde and decanal. Representative examples of dialdehydes include glyoxal, glutaraldehyde and terephthaldehyde. Various mixtures of such aldehydes can also be used in the practice of the invention. The term "water-dispersible" is employed generically herein to include both, those aldehydes which are truly water-soluble and those aldehydes of limited water solubility but which are dispersible in water or other aqueous media to be effective gelling agents. Formaldehyde is the preferred aldehyde compound used in the present invention.

Specific examples of suitable phenolic and water-dispersible aldehyde components are set forth in Swanson, U.S. Pat. No. 4,440,228, the entire contents of which are incorporated herein by reference. The preferred combination of a phenolic and water-dispersible aldehyde is phenol/formaldehyde.

Relative amounts of phenolic and aldehyde components are also set forth in Swanson. These amounts are small but effective to cause the gelation of an aqueous dispersion of the copolymr arid the crosslinking agent. Thus, the amount of the phenolic component used herein is about 2 to about 20, preferably about 2 to about 10, and most preferably about 3 to about 6 percent by weight. Rigid and more thermally stable gels are generally formed at higher phenol concentrations. Aldehyde to phenol molar ratios of between about 1 to 4 are preferred. As such, the amount of aldehyde is about 0.002 to about 15 weight percent, preferably about 3 to about 10 and most preferably about 3 to about 7 weight percent. The above amounts are calculated on the basis of the total weight of the composition comprising the water, the copolymer and the crosslinking agent.

The concentrations of polyvinyl amine copolymer necessary to prepare the gel-forming compositions of the present invention will generally in the range of from about 1.0 to about 20.0 weight percent in order to achieve a useful gel consistency; in most cases, however, concentrations of 1.0 to 10.0 weight percent will be adequate and normally preferred, although reservoir conditions may require other concentrations. Generally, stronger and more stable gels are formed at higher copolymer concentrations. The molecular weight of the copolymer used will also affect the amount of material required to form advantageous gels. Generally, the higher the molecular weight of a polyvinyl amine copolymer, the lower the amount required to form a stable gel. As has been previously stated, it is preferred that the copolymer have a molecular weight of at least about 10,000, with a molecular weight of at least about 100,000 particularly preferred.

The gel-forming compositions of the invention can be prepared on the surface, in a suitable tank equipped with suitable mixing means, and then pumped down the well and into the formation employing conventional equipment for pumping such compositions. Additionally, it is within the scope of the invention to prepare these compositions while they are being pumped down the well. For example, a solution of the copolymer in water can be prepared in a tank adjacent to the wellhead. Pumping of this solution through a conduit to the wellhead can then be started. Then, downstream from the tank, a suitable connection can be provided for introducing a crosslinking agent of this invention. As will be understood by those skilled in the art, the rate of introduction of the crosslinking agents into the conduit will depend upon the pumping rate of the copolymer solution through the conduit. Any of the above-mentioned orders of addition can be employed in such in situ technique. Mixing orifices or baffles can be provided in the conduit, if desired. When gelation is to take place at lower temperatures (<300° F.), base catalysts such as NaOH, $Ba(OH)_2$, $Ca(OH)_2$, $Na_2CO_3$ or the like may be required to assist the reaction.

After the cmposition is injected into the formation and gels, the oil recovery process is conducted in the usual manner, i.e., a displacing fluid, which is miscible or immiscible with the oil, is injected into the formation and the oil is subsequently recovered in a conventional manner. Suitable oil-miscible displacing fluids are carbon dioxide ($CO_2$), carbon monoxide (CO), methane, ethane, propane, butane, natural gas, liquid petroleum gas and mixture thereof. $CO_2$ is the preferred oil-miscible displacing fluid. Suitable oil-immiscible displacing fluids are carbon dioxide, used under oil-immiscible conditions, water or an aqueous fluid, nitrogen, ambient air, steam, flue gas, and mixtures thereof. Because the gel-forming composition of the present invention is substantially stable at high temperatures (up to 400° F.), and does not undergo significant syneresis at such temperatures, it is preferably used in conjunction with the steam flooding of underground oil formations.

The gel-forming compositions of the present invention may also be used in a so-called Water Alternating Gas (WAG) process, well known to those skilled in the art. In such a process, the injection of slugs of water is alternated with the injection of slugs of gas, such as $CO_2$. If the WAG process is used with the compositions of the invention, such composition or compositions are injected into the formation with one or more water slugs.

After the miscible transition zone is established between the formation oil and the displacing fluid, a driving fluid may be injected through the injection well to displace the oil, the transition zone and the displacing fluid through the formation towards the production well from which the oil is produced. The driving fluid is injected for a sufficient time to effect the displacement of the formation oil to the production well until either all of the oil has been displaced from the formation or until the economical limit of the ratio of the driving fluid to the formation oil has been reached.

The driving fluid (also referred to herein as a drive fluid) used in the process of the invention may be any fluid known to those skilled in the art as suitable for that purpose, but preferably it is a fluid selected from the group consisting of water, brine, methane, carbon dioxide, nitrogen, air, steam, separator gas, natural gas, flue gas and mixtures thereof. The driving fluid may contain additives, such as a surfactant, to maintain efficient displacement thereof.

It is within the scope of the invention to precede the injection of the gel-forming composition into the well and out into the formation with a preflush of a suitable cooling fluid, e.g., water. Such fluids cool the well tubing and formation and may extend the useful operating temperature range of the gelled composition. The volume of the cooling fluid injected into the well can be any suitable volume sufficient to significantly decrease the temperature of the formation being treated, and can vary depending upon the characteristics of the formation. For example, amounts of up to 20,000 gallons or more can be used to obtain a temperature decrease on the order of 100° to 250° F.

The copolymers used in the practice of this invention are dissolved in water, at concentrations of between about 1.0 to about 20.0 weight percent, preferably between about 1.0 to about 10.0 weight percent. The solution is then injected into the formation, so as to selectively block the more highly permeable regions, to control the subsequent flooding operation which may be carried out in a conventional manner. Injection of the solution into the formation may be carried out in a conventional manner using an injection well which extends from the surface of the earth into the formation, e.g. as described in U.S. Pat. Nos. 4,078,607, 3,305,016, 4,076,074, 4,009,755 and 4,069,869, to which reference is made for the descriptions of typical procedures which can be used herein. Briefly, the aqueous gel-forming liquid is injected into the formation through the injection well. Once in place in the more highly permeable regions, the gel controls subsequent flooding operations by diverting the flood liquid, such as water or $CO_2$, to the less permeable or "tight" zones, increasing recovery from these zones. The amount of the viscous solution which is injected into the reservoir will generally be from about 10% to about 100% of the pore volume of the high permeability stratum or strata.

Because the compositions of the crosslinked copolymers may be readily varied, e.g., by changing the type or amount of the crosslinking agent, etc., the characteristics of the resultant gels may also be varied. This invention therefore offers the possbility of formulating polymeric gels according to specific reservoir conditions.

The following examples further illustrate the essential features of the invention. However, it will be apparent to those skilled in the art that the specific conditions used in the examples do not limit the scope of the invention.

EXAMPLE 1-5

A poly (vinylamine-vinylamide) copolymer having about 15 mole percent of vinylamine units and about 85 mole percent of vinylamide units, with a molecular weight of about 2,000,000 was used in the formation of the gels of these examples. The copolymer was obtained from Air Products and Chemicals, Inc. of Allentown, Pa. Phenol and formaldehyde were used at various concentrations to form the crosslinking agent for the aqueous solutions of the copolymeric material. NaOH was used in Examples 2 and 4 to serve as a catalyst for the crosslinking reaction.

The compositoions of Examples 1-5 were prepared in a synthetic sea water brine. Thermal stability of those compositions were determine by subjecting small samples thereof (about 10 gr) to a temperature of about 400° F. for an extended time period. The samples, in small glas vials, were inserted into stainless steel bombs (1" O.D. tubing with Swagelock caps), partially surrounded with water, sealed, placed in an oven, and maintained at the temperature of about 400° F. for the length of time indicted in Table 1. After the testing period, the degree of syneresis of each sample was determined by cooling the bomb to ambient temperature, removing the vial from the bomb, estimating the size of the polymer plug by measuring the height and diameter of the gel plug, and calculating the degree of syneresis (%) from the following equation:

$$\% \text{ Syneresis} = 100 \times \frac{\text{Sample Volume} - \text{Gel Volume}}{\text{Sample Volume}}$$

wherein:
"Sample Volume" is the initial volume of the sample before the heating treatment is commenced; and
"Gel Volume" is the final volume of the gel present in the vial after the heating treatment is terminated.
Results of the thermal stability tests are as follows:

TABLE 1

Poly (vinylamine-vinylamide) Gel Test

| Example Number | Composition, % | | | | Days @ 400° F. | Gel Syneresis % |
|---|---|---|---|---|---|---|
| | Polymer | Phenol | HCHO | NaOH | | |
| 1 | 2.0 | 8 | 8.4 | 0.0 | 24 | 0 |
| 2 | 2.0 | 4 | 4.2 | 0.4 | 24 | 0 |
| 3 | 2.0 | 4 | 4.2 | 0.0 | 24 | 0 |
| 4 | 2.0 | 4 | 5.1 | 0.4 | 24 | 0 |
| 5 | 2.0 | 3 | 3.9 | 0.0 | 24 | 0 |

As indicated, gels of excellent thermal stability were obtained in all cases.

As may be seen from these test results, all gels were found to be very stable and would be expected to perform well even under the harsh conditions encountered during steam flooding enhanced oil recovery operations.

Although the present invention has been described with preferred embodiments, it is to be understood that modifications and variations may be utilized without departing from the spirit and scope of this invention, as those skilled in the art will readily understand. Such modifications and variations are considered to be within the purview and scope of the appended claims.

What is claimed is:

1. A process for recovering oil from a subterranean oil-bearing formation having relatively high permeability zones and relatively low permeability zones penetrated by an injection well and at least one production well in fluid communication with a substantial portion of the formation, comprising the steps of:
   (a) injecting into the relatively high permeability zones of the formation via the injection well an aqueous gel-forming composition comprising water, a viscosifying amount of a water-dispersible polyvinyl amine copolymer; and a crosslinking agent which is a mixture of a phenolic component and an aldehyde, said crosslinking agent present in an amount effective to cause gelation of said polyvinyl amine copolymer;
   (b) injecting a flooding fluid into the formation via the injection well that preferentially enters the low permeability zones; and
   (c) recovering fluids including oil from the formation via the production well.

2. The process of claim 1, wherein in step (a) said polyvinyl amine copolymer is a copolymer of vinylamine and vinylamide having the structure:

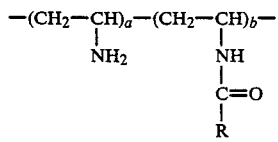

wherein:
R is an alkyl or aryl group having no more than 16 carbon atoms; and
a and b are mole fractions of each comonomer unit such that $a+b=1$, and $a \neq 0$ and $b \neq 0$.

3. The process of claim 2 wherein in step (a) said polyvinyl amines copolymer has a molecular weight of at least about 10,000 and the vinylamine comonomer is present in an amount of at least about 2 mole percent.

4. The process of claim 3, wherein in step (a) said polyvinyl amine copolymer has a molecular weight of at least about 100,000 and the vinylamine comonomer is present in an amount of about 0 to 30 mole percent.

5. The process of claim 3, wherein in step (a) said vinylamide comonomer is selected from the group consisting of N-vinylalkyls and N-arylamides.

6. The process of claim 5, wherein in said step (a) said phenolic mixture comprise about 1 to 99 weight percent of at least one phenolic compound selected from the group consisting of phenol, resorcinol, catechol, phloroglucinol, pyrogallol, 4,4'-diphenol and 1,3-dihydroxynaphthaline; and about 1 to about 99 weight percent of at least one aldehyde component selected from the group consisting of aliphatic monoaldehydes, aromatic monoaldehydes, aliphatic dialdehydes and aromatic dialdehydes.

7. The process of claim 6, wherein in step (a) said phenolic compound in phenol and said aldehyde component is formaldehyde.

8. The process of claim 7, wherein in step (a) said phenol and said formaldehyde are present in a molar ratio of about 1 to 4.

9. The process of claim 8, wherein in step (a) said polyvinyl copolymer is present in an amount of between about 1 and 10 weight percent.

10. The process of claim 1, wherein the flooding fluid of step (b) is steam.

* * * * *